United States Patent
Sunagawa (10) Patent No.: US 6,552,777 B2
(45) Date of Patent: Apr. 22, 2003

(54) IMAGE EXPOSING METHOD AND IMAGE EXPOSING APPARATUS

(75) Inventor: Hiroshi Sunagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/805,468

(22) Filed: Mar. 14, 2001

(65) Prior Publication Data

US 2001/0035944 A1 Nov. 1, 2001

(30) Foreign Application Priority Data

Mar. 14, 2000 (JP) ........................................ 2000-069975

(51) Int. Cl.[7] .................. G03B 27/54; G03B 27/58; G03B 27/32
(52) U.S. Cl. ................ 355/67; 355/47; 355/77
(58) Field of Search .............................. 355/32, 38, 40, 355/41, 47, 60, 67; 358/474; 359/216, 217, 292; 347/135, 255

(56) References Cited

U.S. PATENT DOCUMENTS 5,105,207 A * 4/1992 Nelson ........................ 346/160
5,844,588 A * 12/1998 Anderson .................... 347/135
5,917,577 A * 6/1999 Okino et al. .................. 355/32

FOREIGN PATENT DOCUMENTS

JP        2000-19662        1/2000        ........... G03B/27/73

* cited by examiner

Primary Examiner—Henry Hung Nguyen
(74) Attorney, Agent, or Firm—Sughrue Mion, PLLC (57) ABSTRACT

The image exposing method and apparatus expose a light-sensitive material with the light emitted from a light source matching the spectral sensitivity of the material and modulated with a two-dimensional spatial modulator. The light-sensitive material and the modulator are relatively scanned in the direction of one pixel column in the modulator, as well as, in synchronism with this scanning, the image created by the modulator is also scanned in the scanning direction so as to perform multiple exposures of the material and exposure with part of the pixels in at least one of the pixel columns is rested always irrespective of the image to be recorded such that a maximum quantity of exposure with each of the pixel columns in the scanning direction in equal in each pixel column.

30 Claims, 3 Drawing Sheets

IMAGE EXPOSING METHOD AND IMAGE EXPOSING APPARATUS

BACKGROUND OF THE INVENTION

This invention relates to the technology of image exposure using two-dimensional spatial modulators such as a digital micro-mirror device. More particularly, the invention relates to an image exposing method and an image exposing apparatus that feature highly efficient utilization of light and which provide sufficiently uniform light to achieve uneven image exposure.

The digital image exposing systems currently used in various printers mostly depend on so-called laser beam scan (raster scan) for exposure, in which laser beams are deflected in a main scanning direction as a light-sensitive material and optics are moved relatively in an auxiliary scanning direction perpendicular to the main scanning direction, thereby performing two-dimensional exposure of the light-sensitive material with the laser beams modulated in accordance with the image to be recorded.

Various proposals have recently been made to perform digital image exposure using two-dimensional spatial modulators such as liquid-crystal displays (hereunder abbreviated as LCDs) and digital micro-mirror devices (hereunder abbreviated as DMDs) that are used as display means in displays and monitors. The basic principle of this exposing system is that the image displayed by means of a two-dimensional spatial modulator (hereunder referred to simply as a spatial modulator) is imaged on a light-sensitive material to expose it. For the purpose of rapid exposure, DMDs are more advantageous than LCDs since they permit faster modulation (response) and achieve more efficient utilization of light.

Digital exposing system using spatial modulators are disclosed in several prior patents, among which may be mentioned Unexamined Published Japanese Patent Application (kokai) No. 19662/2000. The exposing system disclosed in this patent creates a full-color image using light of three primary colors, R (red), G (green) and B (blue), and a spatial modulator (typically DMD). In this exposing system, the modulator (optics including it) and a light-sensitive material are scanned relatively in one direction of the pixel array of the DMD as the image displayed by the spatial modulator is scanned in synchronism in a corresponding direction, thereby achieving multiple exposures of the light-sensitive material. As a result, the gradation characteristics and the efficiency of light utilization are sufficiently improved to enable the outputting of images comparable in quality to photographs.

The use of digital technology is also under review in the printing platemaking art and computer-to-plate (CTP) systems have been proposed. In CTP, editing and related operations are performed with workstations and personal computers (PC), (digital) image data is generated for each of the created individual pages, and a PS plate is exposed with recording light modulated with the image data, thereby accomplishing direct platemaking from the input device such as PC to the PS plate.

In order to realize CTP by the existing technology, it is necessary to use a special PS plate that permits exposure with laser beams. However, compared to the conventional PS plates which are exposed by ultraviolet light (hereunder referred to simply as the conventional PS plate), the special PS plate is not only costly but also low in stability during development. Another difference concerns printability and depending on the type of prints, products of satisfactory quality are sometimes difficult to obtain. Furthermore, exposing of the special PS plate requires expensive light sources such as a visible light laser and a high-power infrared laser.

A CTP system has been proposed that allows for exposure of the conventional PS plate by using the aforementioned spatial modulator. In the system, an ultraviolet lamp is used as a light source and the image displayed by the spatial modulator is focused on the conventional PS plate to expose it. To be more specific, the DMD image is focused for a predetermined exposure time in a selected area of the conventional PS plate at rest, then the optics are moved to expose an adjacent area, and the same procedure is repeated. The time required to move the optics many times adds up to increase the time necessary for exposing the entire surface of the plate.

As a problem common to all exposing systems using spatial modulators that include not only the above-described CTP system but also the exposing system disclosed in Unexamined Published Japanese Patent Application No. 19662/2000, supra, the light incident on the light-sensitive material is low in the uniformity of its quantity and the resulting image has unevenness in density and other defects.

SUMMARY OF THE INVENTION

The present invention has been accomplished under these circumstances and has as a first object providing an image exposing method that can expose light-sensitive materials using a two-dimensional spatial modulator with high efficiency of light utilization and improved uniformity in light quality and which is particularly suitable for use with CTP systems that employ the conventional PS plate.

The present invention has also as a second object providing an image exposing apparatus that implements the image exposing method of the present invention in addition to the first object.

In order to attain the first object described above, the first aspect of the present invention provides an image exposing method, comprising the steps of: emitting light from a light source matching the spectral sensitivity of a light-sensitive material; modulating the thus emitted light with a two-dimensional spatial modulator; and exposing the light-sensitive material with the thus modulated light wherein the light-sensitive material and the two-dimensional spatial modulator are relatively scanned in a direction of one pixel column in the two-dimensional spatial modulator, as well as, in synchronism with this scanning, an image created by the two-dimensional spatial modulator is also scanned in the direction so as to perform multiple exposures of the light-sensitive material and wherein exposure with part of pixels in at least one of pixel columns is rested always irrespective of the image to be recorded such that a maximum quantity of exposure with each of the pixel columns in the direction is equal in each pixel column.

Preferably, successive measurements of quantity of light from a predetermined number of pixels are performed for all pixels and the pixels for which exposure is rested always are determined from results of the measurements.

Preferably, the two-dimensional spatial modulator is a digital micro-mirror device and quantities of light from the predetermined number of pixels or pixel columns are measured with reflected light in non-exposure mode.

Preferably, the two-dimensional spatial modulator is a digital micro-mirror device and quantities of light from the predetermined number of pixels or pixel columns are measured with reflected light in non-exposure mode.

In order to attain the second object described above, the second aspect of the present invention provides an image exposing apparatus, comprising: a light source for emitting light matching the spectral sensitivity of a light-sensitive material; a two-dimensional spatial modulation for modulating the light emitted from the light source in each of two-dimensional pixels; an exposing unit for exposing the light-sensitive material with the light modulated by the two-dimensional spatial modulator; wherein the exposing unit comprises: a first scanning unit for relatively scanning the light-sensitive material and the two-dimensional spatial modulator in a direction of one pixel column in the two-dimensional spatial-modulator; a second scanning unit for also scanning an image created on the light-sensitive material by the light modulated in each of the two-dimensional pixels by the two-dimensional. spatial modulator in the direction in synchronism with relative scanning so as to perform multiple exposures of the light-sensitive material; and control unit for controlling the two-dimensional spatial modulator in such a way that exposure with part of pixels in at least one of pixel columns is rested always irrespective of the image to be recorded such that a maximum quantity of exposure with each of the pixel columns of the two-dimensional pixels of the two-dimensional spatial modulator in the direction is equal in each pixel column.

Preferably, the first scanning unit is a scanning unit for moving the light-sensitive material with respect to the two-dimensional spatial modulator.

Preferably, the first scanning unit is a drum scanner.

Preferably, the second scanning unit is a switching unit for switching on or off exposure of the image created by the two-dimensional spatial modulator.

Preferably, the two-dimensional spatial modulator is a digital micro-mirror device.

DETAILED DESCRIPTION OF THE INVENTION

The image exposing method and the image exposing apparatus of the invention are described below in detail with reference to the preferred embodiments shown in the accompanying drawings.

Figure 1:
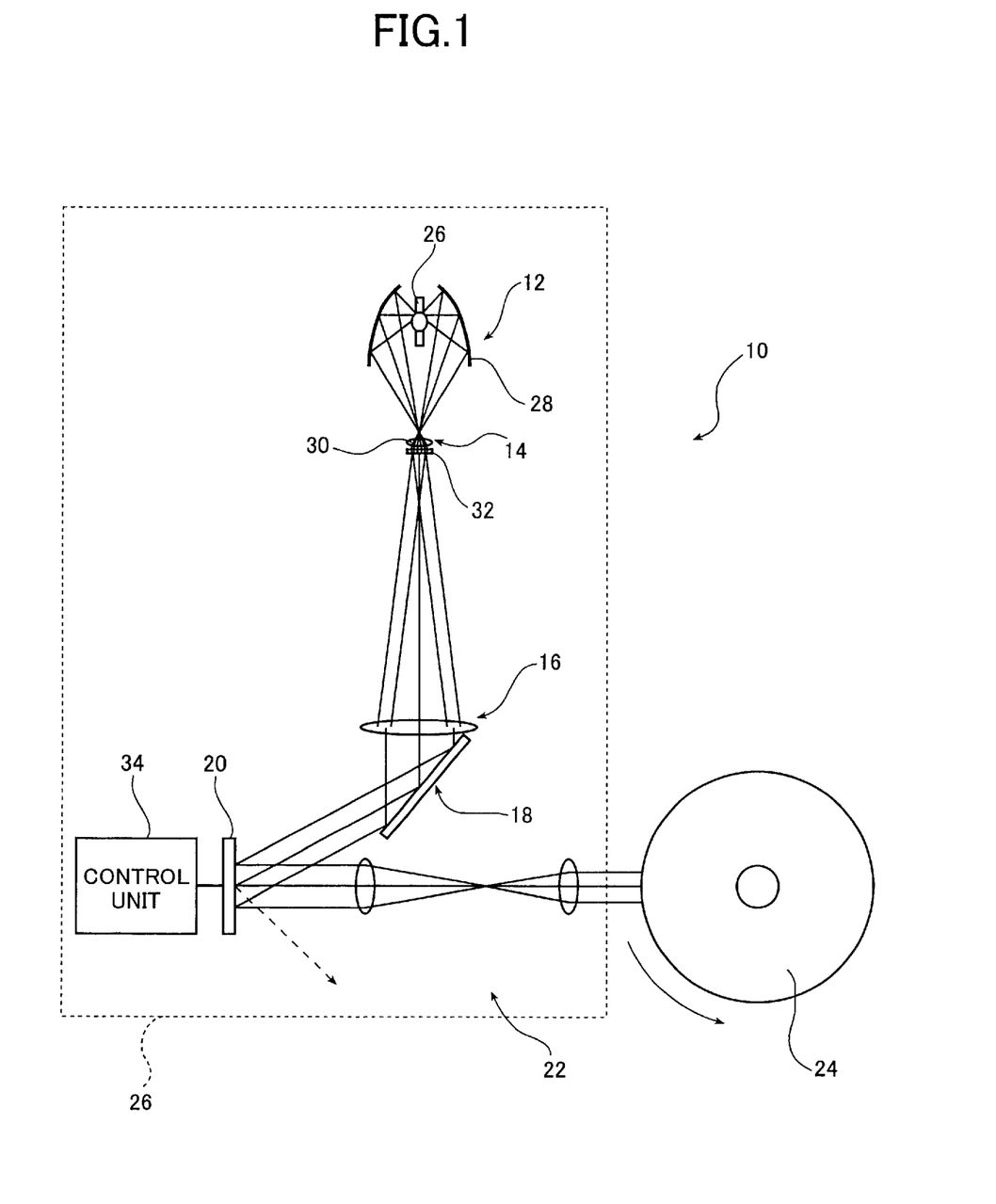
FIG. 1 shows in conceptual form an embodiment of an image exposing apparatus of the present invention that implements an image exposing method of the invention.

FIG. 1 shows in conceptual form an embodiment of an image exposing apparatus of the present invention that implements an embodiment of an image exposing method of the invention. The image exposing apparatus generally indicated by 10 in FIG. 1 (which is hereunder referred to simply as the exposing apparatus 10) is a system that performs two-dimensional scan and exposure of a light-sensitive material using a DMD (digital micro-mirror device) which is a two-dimensional spatial modulator and a so-called "external drum". The basic components of the exposing apparatus 10 are a light source section 12, uniform illumination optics 14, a collimator lens (optical collimator) 16, a reflector mirror 18, DMD 20, imaging optics 22, external drum 24 (hereunder drum 24), and an auxiliary scan drive mechanism (not shown). Issuing light that exposes the light-sensitive material, the light source section 12 comprises a light source 26 and a reflector 28. As long as sufficient quantity of light can be emitted, various types of light sources may be used and a suitable type is chosen that matches the spectral sensitivity of the light-sensitive material to be exposed. If the light-sensitive material is the conventional PS plate that can be exposed with ultraviolet light, the light source 26 may be an ultraviolet lamp such as an ultrahigh pressure mercury-vapor lamp or a metal halide lamp.

The reflector 28 is an ellipsoid of revolution that embraces the light source 26 and which has a light reflecting inner surface. It reflects the light from the light source 26 such that it is converged in the focal position.

The light issued from the light source section 12 is subsequently launched into the uniform illumination optics 14 so that the light incident on the DMD 20 (particularly the distribution of its quantity) is made uniform across the surface of the DMD 20 (its two-dimensional array of pixels). In the illustrated case, the uniform illumination optics 14 comprise a collimator lens 30 and a fly eye lens 32.

The uniform illumination optics 14 is positioned just downstream (the path of travelling light) from the point of its focusing by the reflector 28; the incident light is rendered parallel by the collimator lens 30 and then diffused by the fly eye lens 32 of a rectangular shape, so that the light incident on the DMD 20 will be in a rectangular shape that conforms to the pixel array of the DMD 20 and which has a uniform distribution of light quantity.

The light diffused by the uniform illumination optics 14 is rendered parallel by the collimator lens 16 and reflected by the mirror 18 in a predetermined direction before it is incident on the DMD 20. The mirror 18 reflects the incoming parallel light so that it will be incident on the DMD 20 (with the micro-mirrors in level position) at an angle of $2\theta$, assuming that the micro-mirrors rotate through angles of $\pm\theta$. For instance, if the micro-mirrors rotate through angles of $\pm 10°$, the parallel light will be incident on the DMD 20 at an angle of 20°.

As well known, the DMD 20 is a two-dimensional spatial modulator comprising a two-dimensional array of rectangular micro-mirrors that can each rotate (pivot) on a specified axis by predetermined angles. Through electrostatic rotation of the micro-mirrors, the DMD 20 modulates light by turning the exposure on and off for each micro-mirror (=pixel). A control unit 34 is connected to the DMD 20 and controls the DMD 20 so as to switch the exposure for each pixel on and off. The DMD 20 having this function is created on a silicon chip by the micromachining technology utilizing the fabrication process of semiconductor devices.

Take, for example, the case where light is incident at an angle of 20° on the micro-mirrors that rotate by angles of $\pm 10°$; if the exposure is ON, the incident light is reflected from the DMD 20 (with the micro-mirrors in level position) in normal direction and the resulting image-bearing light is past through the imaging optics 22 to be focused on the surface of the drum 24; if the exposure is OFF, the incident light is reflected at an angle of 40° with the normal and is not launched into the imaging optics 22.

As a typical example, the DMD 20 in the illustrated exposing apparatus 10 consists of 1280×1024 pixels with a pixel-to-pixel spacing of 17 $\mu$m.

The drum 24 to be described later and the DMD 20 are positioned in such a way that the rotating direction of the drum 24 optically coincides with the direction in which the array of 1024 pixels extends (which is hereunder referred to as a main scanning direction) whereas the axial direction of the drum 24 optically coincides with the direction in which the array of 1280 pixels extends (which is hereunder referred to as an auxiliary scanning direction).

The two-dimensional spatial modulator-to be used in the present invention is by no means limited to the illustrated DMD 20 and various other known types may be used, such as a liquid crystal display (LCD) device and a spatial modulator using ferroelectric liquid-crystals. Among these, DMD is the most preferred in view of modulation speed and efficiency of light utilization.

The image-bearing light (i.e., bearing the image formed by the DMD 20) which has been reflected from the DMD 20 in the normal direction is processed by the imaging optics 22 so that it focuses on the surface of the drum 24 (i.e., on the surface of the light-sensitive material held on the drum surface). The DMD 20 and the drum 24 are so positioned that the center pixel of the DMD 20 coincides with the optical axis of the imaging optics 22, which in turn crosses the tangential to the drum 24 at right angles.

In a typical case, the illustrated exposing apparatus 10 exposes an image of 2400 dpi. Since the pixel-to-pixel spacing on the exposing surface is 10.58 μm, the light bearing the image modulated and reflected by the DMD 20 is imaged by the imaging optics 22 and focused on the drum 24 at a magnification of 0.623. Hence, the exposing surface can provide an exposing area of 13.5 mm×10.8 mm.

The (external) drum 24 is a cylinder that holds the light-sensitive material on the outer circumference and which rotates on the longitudinal axis.

In the exposing apparatus 10, the light source section 12 and the subsequent optics up to the imaging optics 22 are assembled into a unit as indicated by the dashed line in FIG. 1. The unit which is hereunder referred to as an optics unit 26 is adapted to be capable of moving at a predetermined speed in the auxiliary scanning direction by a known method.

The exposing apparatus 10 is a so-called "drum scanner" type; during exposure of the light-sensitive material, the light modulated in accordance with the image to be recorded is allowed to be incident on the drum 24 (the light-sensitive material on its surface) and the optics unit 26 is moved in the auxiliary scanning direction as the drum 24 rotates (to effect main scanning). As a result, the image-beaing light performs two-dimensional scan exposure of the light-sensitive material to record an image on it, thereby making the conventional PS plate (to give just one example).

As already mentioned, the exposing area in the exposing surface that can be produced by the exposing apparatus 10 in the auxiliary scanning direction is 13.5 mm long at maximum, so if the drum 24 rotates fully, the optics unit 26 moves by 13.5 mm in the auxiliary scanning direction.

Since the DMD 20 has 1280 pixels in the auxiliary scanning direction, the exposing apparatus 10 is capable of multiple exposures for 1280 pixels.

In synchronism with the rotation (main scan) of the drum 24 during this exposure mode of the exposing apparatus 10, the images formed by the DMD 20 (as a result of modulation by the DMD 20) are also scanned (moved) in the main scanning direction to achieve multiple exposures. In other words, as the drum 24 rotates for one pixel (by 10.58 pm), the image formed by the DMD 20 also moves by one pixel in the main scanning direction. In the illustrated case, up to 1024 exposures are performed by the exposing apparatus 10.

Such multiple exposures enhance the efficiency of light utilization so that the light-sensitive material can be exposed with an adequate quantity of light; as a result, platemaking can be accomplished by exposing the conventional PS plate with a common uv lamp such as an ultrahigh-pressure mercury lamp or a gradation image can be recorded at the intended resolution by making the most of the pixels in the main scanning direction. Particularly advantageous image exposure can be accomplished by the illustrated DMD 20 since it permits more efficient utilization of light than LCDs and other two-dimensional spatial modulators.

According to the invention, the exposing apparatus 10 does not perform multiple exposures using all pixels in the main scanning direction by the DMD 20 but part of the pixels in at least one column of pixels in the main scanning direction (hereunder referred to simply as "pixel column") is rendered normally OFF (in non-exposure mode) irrespective of the generated image data so that the total quantity of light, or the sum of the quantities of light, from all driven pixels is equal in each pixel column under the control of the control unit 34.

In other words, part of the pixels in at least one pixel column is rendered normally OFF so that a maximum amount of exposure achieved by multiple exposures is equal (i.e., within a tolerable range) in all pixel columns that perform exposure (i.e., all pixels in the exposed light-sensitive material).

Figure 2:
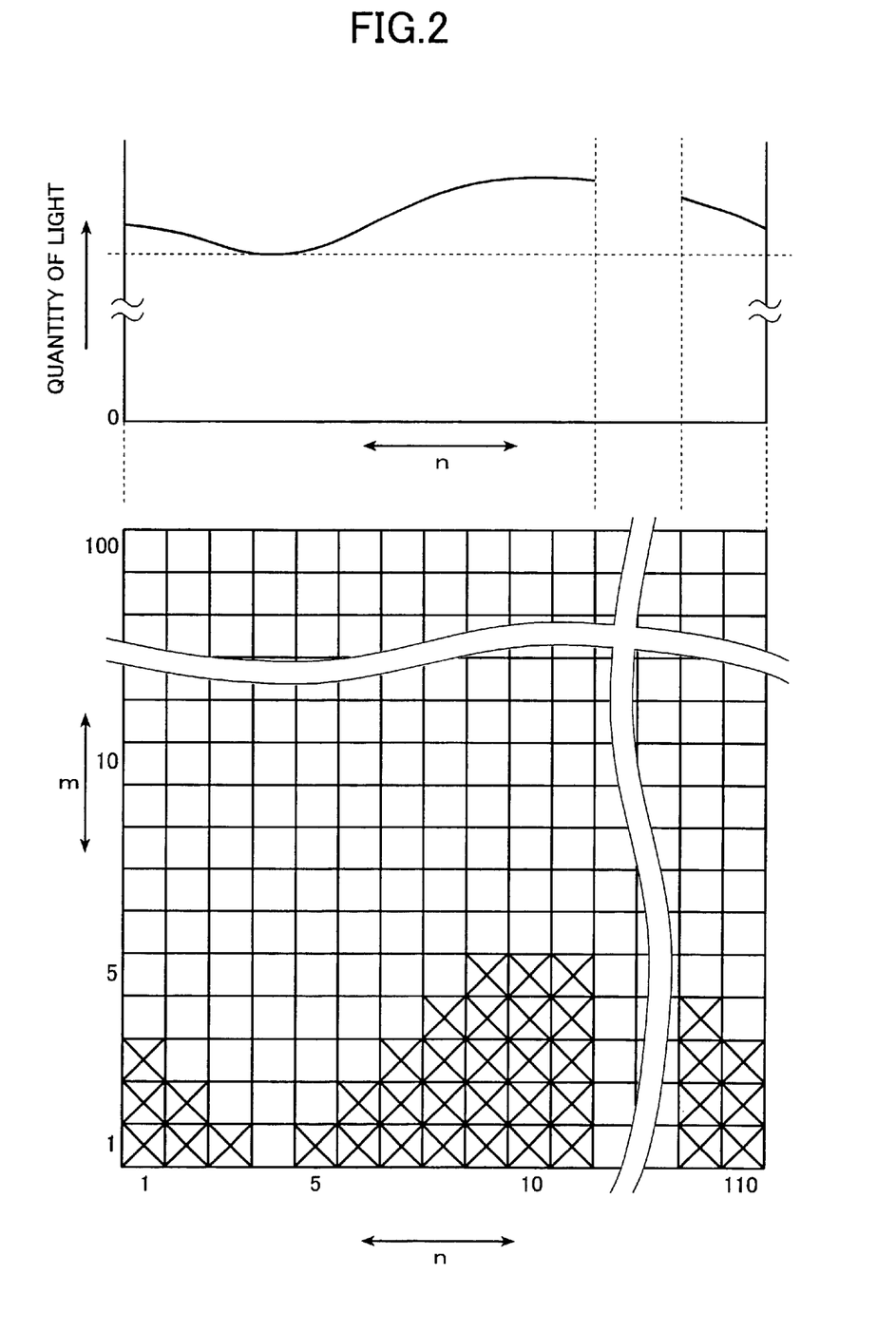
FIG. 2 shows in conceptual form the operating principle of the image exposing method of the invention.
Figure 3:
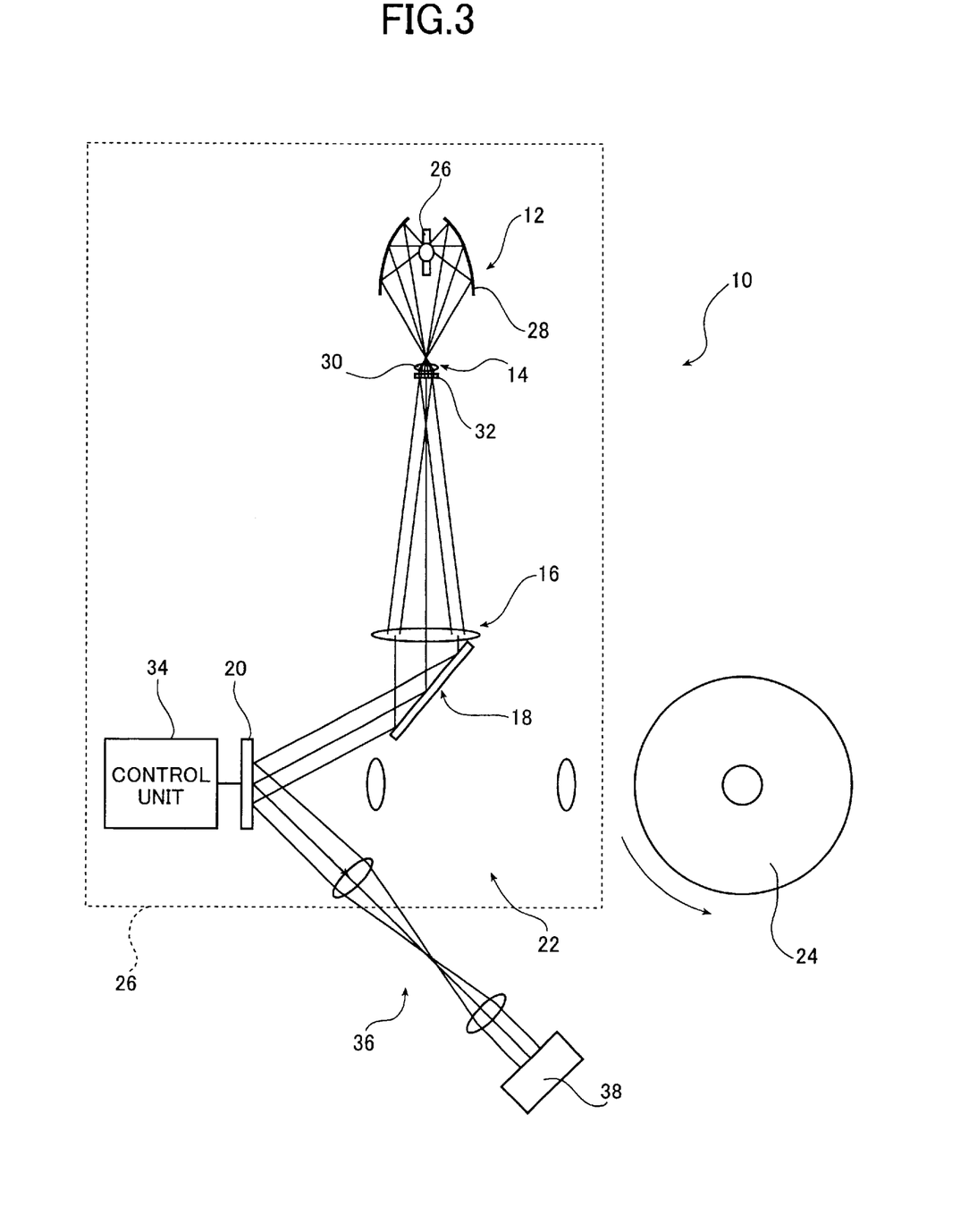
FIG. 3 shows in conceptual form a method of determining the pixels that remain normally OFF in the practice of the image exposing method of the invention.

This point is further explained below with reference to FIG. 2. FIG. 2 is a schematic representation of an exemplary DMD consisting of 100 pixels×110 pixels, with each rectangle of the grid pattern corresponding to one pixel or one micro-mirror. In the illustrated example, 100 pixels align in the main scanning direction (indicated by arrow m) and 110 pixels in the auxiliary scanning direction (indicated by arrow n); therefore, the DMD shown in FIG. 2 consists of 100 pixel rows that lie one on top of another in the main scanning direction and 110 pixel columns lying side by side in the auxiliary scanning direction.

Suppose here that the quantity of light added up by turning on all pixels (100 pixels) in each pixel column (i.e., the quantity of light as integrated over all pixels in each pixel column) draws the curve shown graphically in the upper section of FIG. 2. Obviously, pixel column 4 emits the smallest quantity of light whereas pixel columns 9–11 emit the largest quantity of light.

Given this intensity distribution, in order to ensure that the total quantity of light from all driven pixels in each of the 110 pixel columns (i.e., a maximum amount of exposure) is equal to the added-up quantity of light from pixel column 4, part of the pixels in the other columns is accordingly made normally OFF. As an example, three pixels are made normally OFF in column 1, two in column 2, . . . , no pixel is made normally OFF in column 4, one in column 5, . . . , five in column 10, . . . , four in column 109 and three in column 110 (the normally OFF pixels are indicated by crosses in FIG. 2), so that the total quantity of light from each pixel column is equal to that from column 4.

The DMD 20 shown in FIG. 1 has 1024 pixels in the main scanning direction (indicated by arrow m) and 1280 pixels in the auxiliary scanning direction (indicated by arrow n); in other words, the DMD 20 consists of 1024 rows and 1280 columns. If the total quantity of light from the pixels in each column is to be made equal to the added-up quantity of light from the pixel column of lowest light intensity, about 50 pixels may be rendered normally OFF in the columns emitting 5% more light and about 100 pixels may be rendered normally OFF in the columns emitting 10% more light, so that the total quantity of light is equal among all pixel columns.

In image exposure using spatial modulators, the quantity of light from all pixels is not always uniform but some distribution occurs depending upon various factors such as the distribution of light quantity from the light source, errors in the spatial modulator and the optics used, and the lens characteristics. In multiple exposures, such distribution in the quantity of light causes variation in maximum amount of exposure from one pixel column to another and the resulting uneven image exposure is a cause of deterioration in image quality.

By using the exposing apparatus of the invention, the total quantity of light can be made uniform in all pixel columns (that perform exposure), thereby ensuring that multiple exposures are performed with a maximum amount of exposure being made uniform in high precision. Turning back to the DMD 20, each pixel column has 1024 pixels, so the total quantity of light can be adjusted to an accuracy of about 0.1%. Therefore, in multiple exposures using a spatial modulator, the light-sensitive material can be exposed with a uniform quantity of light over the entire surface to achieve exposure of high-quality images.

In the exposure of a PS plate, image recording is binary, so all pixels in the main scanning direction (in a column) are turned ON or OFF in accordance with the generated image data. Therefore, according to the present invention which enables uniform exposure of the light-sensitive material for all pixels, the PS plate can be exposed uniformly in very high precision.

When exposing a gradation image, a match in maximum density can be attained for all pixels. Even if the image resolution is lower than the number of pixels in the main scanning direction, the pixels may be selectively driven to provide uniformity in gradation among all pixels, thereby enabling the recording of high-quality image.

Thus, according to the present invention, even and precise image exposure can be accomplished with two-dimensional spatial modulators to provide satisfactory efficiency of light utilization and high uniformity in the quantity of light. If the invention is applied to CTP in the printing art, the conventional PS plate can be exposed precisely and evenly using common light sources such as an ultrahigh-pressure mercury-vapor lamp, thereby offering various advantages such as reduction in the cost of the light-sensitive material, establishment of stability in development, and standardization of printability.

In the exposing method of the invention, the pixels to be rendered normally OFF are not limited to those in the neighborhood of an edge of the DMD as shown in FIG. 2; if desired, the pixels in the middle in the main scanning direction may be rendered normally OFF. The pixels to be rendered normally OFF need not be continuous in the main scanning direction but they may be set at regular or irregular intervals.

The total quantity of light need not be made equal to the added-up quantity of light from the pixel column emitting the smallest amount of light and it may be set to a smaller value in consideration of the margin of the tolerable range and other factors.

There is no limitation on the method of determining the pixels that are to be rendered normally OFF and various methods can be employed. The following method may be given as a preferred example.

First, a photodetector having adequate speed of measurement is provided in the optics unit 26 in a position optically equivalent to the drum 24 (exposing surface).

Then, DMD 20 (two-dimensional spatial modulator) is successively turned on, a predetermined number of pixels on at a time, and the quantities of light from the ON pixels are measured; after performing this procedure for all pixels in the DMD 20, the added-up quantity of light from all pixels in each pixel column (i.e., the quantity of light integrated over all pixels in each pixel column) is calculated.

The number of pixels to be turned on at a time is not limited to any particular value but 1–100 pixels are preferably turned on at a time for the principal reason that the pixels to be rendered normally OFF can be determined in an appropriate manner. In a particularly preferred case, the pixels are turned on one by one to determine the quantity of light from each pixel.

In the case of measurement by turning on more than one pixel at a time, it may become necessary to calculate the quantity of light from each pixel; in that case, various methods of calculation may be employed such as taking the average for the ON pixels or examining the tendency of the distribution in the quantity of light from the ON pixels.

Thereafter, a certain threshold for the total quantity of light is determined (an example is the added-up quantity of light from the pixel column emitting the least amount of light) and in order to ensure that the total quantity of light from all pixels is equal in each column, the pixels to be rendered normally OFF are determined for each column on the basis of the quantities of light from the predetermined number of pixels that have been turned on in the measurement.

At first glance, this method seems somewhat cumbersome since the quantity of light is measured with a predetermined number of pixels turned on at a time; however, if DMD is used as the two-dimensional spatial modulator, the modulation speed is very fast and the method is not as time-consuming as it first looks to be.

As a further advantage, the pixels to be rendered normally OFF are determined by measuring the quantity of light with a predetermined number of pixels, preferably each pixel, being turned on at a time; therefore, in the usual case the total quantity of light can be made uniform in a single step and in an accurate manner.

The pixels to be rendered normally OFF can be determined by another method. A photodetector is provided in the same position as in the first method, all pixels in a predetermined number of columns are simultaneously turned on and the quantities of light from the ON pixels are measured; this procedure is repeated for all pixel columns and the added-up quantity of light is calculated for each pixel column; then, as in the first method, a certain threshold for the total quantity of light is determined (an example is the added-up quantity of light from the pixel column emitting the least amount of light) and the pixels to be rendered normally OFF are determined for each column such that the total quantity of light from all pixels is equal in each column. This alternative method permits faster measurement than the first method.

The number of pixel columns in which all pixels are to be turned on simultaneously is not limited to any particular value but 1–10 pixel columns are preferred for the principal reason that the pixels to be rendered normally OFF can be determined in an appropriate manner. In a particularly preferred case, all pixels are turned on, one column at a time, to determine the quantity of light from each pixel column.

In the case of measurement by turning on the pixels in more than one pixel column at a time, the added-up quantity of light from each pixel column may be calculated by various methods, such as taking the average for the measured pixel columns or examining the tendency of the distribution in the quantity of light from the measured pixel columns.

To determine the pixels to be rendered normally OFF, various methods may be employed, such as calculating the average quantity of light for one pixel in each pixel column and determining the (number of) pixels to be rendered OFF for each pixel column. A preferred method is as follows.

First, in the manner described above, the added-up quantity of light is measured for all pixel columns and a threshold for the total quantity of light is set. Then, with the quantity of light being measured for successive pixel columns, the pixels are turned on one by one to measure the quantity of light from each pixel. When the quantity of light from a particular pixel column has reached the threshold, the process of turning on the pixels one by one is stopped and the pixels that have not been turned on are determined as those which are to be rendered normally OFF. Alternatively, all pixels are first turned on, then successively turned off, and the same procedure as just described above is performed.

In either case, the pixels need not be turned on one by one but may be turned on in groups of two or more pixels.

After thusly determining the pixels that are to be rendered normally OFF, all other pixels may optionally be turned on for each pixel column and the added-up quantity of light from each pixel column is measured to make sure that the total quantity of light is equal to the threshold (within the tolerable range); if the total quantity of light is not found uniform in an appropriate manner, the pixels to be rendered normally OFF are determined again and a similar check is optionally made.

In the foregoing description, the quantities of light from pixels or pixel columns are measured with a photodetector being placed in a position optically equivalent to the drum 24. In the illustrated case where DMD 20 is used as the two-dimensional spatial modulator, the quantity of OFF light as emitted in the non-exposure mode rather than in the exposure mode may be measured to determine the pixels that are to be rendered normally OFF.

An example of the applicable method is as follows. Assume the already-described case in which light is incident at 20° and DMD 20 which consists of micro-mirrors that rotate through angles of ±10. In the exposure mode, the incident light is reflected back in the normal direction but in the non-exposure mode, the light is reflected at an angle of 40° with the normal as indicated by the dashed line in FIG. 1. On the basis of this fact, imaging optics 36 and a photodetector 38 are placed in positions that are optically equivalent to the imaging optics 22 and the drum 24, and the quantity of the OFF light emitted in the non-exposure mode is measured in order to measure the quantities of light from pixels or pixel columns.

The frequency of determining (or updating) the pixels that are to be rendered normally OFF depends basically upon the stability of the light source 28; they may be determined (or updated) just before the exposing operation or the frequency, may be once a day (e.g. before the start or after the end of the work for the day). A lower frequency will do if the exposing system has higher operating stability. If there occurs a certain change that will affect the characteristics of the exposing system such as replacement of light source 28, the pixels that are to be rendered normally OFF are preferably updated.

While the image exposing method and the image exposing method of the invention have been described above in detail, it should be understood that the invention is by no means limited to the foregoing embodiments and various improvements and modifications can of course be made without departing from the scope and spirit of the invention.

For example, the exposing apparatus that can be used to implement the exposing method of the invention is not limited to the illustrated apparatus 10 which is a drum scanner using an external drum. It may be replaced by an exposing apparatus that scans and exposes the light-sensitive material in flat form using a flat bed or twin nip rollers or it may be an exposing apparatus that uses platen rollers.

Speaking of the exposing systems that use a flat bed, twin nip rollers, platen rollers or the like, there may be a case where the light-sensitive material is larger than the number of pixels in the auxiliary scanning direction of the optics (i.e., pixels for multiple-exposures); in a case like this, a mechanism such as an x-y stage is used to perform multiple exposures with the light-sensitive material (flat bed that supports it) and the optics being relatively scanned in the main scanning direction; thereafter, the light-sensitive material and the optics are relatively moved in the auxiliary scanning direction by a specified distance (corresponding to the number of pixels for multiple exposures); multiple exposures are performed again by scanning in the main scanning direction. In this case, either the optics or the light-sensitive material or both of these are moved (main scanning is accomplished by transport of the light-sensitive material and movement in the auxiliary scanning direction is done by the optics).

Thus, the concept of the invention is applicable to all kinds of known exposing methods and apparatus that perform multiple exposures of light-sensitive material by scanning and exposing with two-dimensional spatial modulators such as DMDs.

As described above in detail, according to the present invention, even and precise image exposure can be accomplished with two-dimensional spatial modulators to provide satisfactory efficiency of light utilization and high uniformity in the quantity of light. If the invention is applied to CTP in the printing art, the conventional PS plate can be exposed precisely and evenly using common light sources.

What is claimed is:

1. An image exposing method, comprising the steps of:
    emitting light from a light source matching the spectral sensitivity of a light-sensitive material;
    modulating the thus emitted light with a two-dimensional spatial modulator; and
    exposing the light-sensitive material with the thus modulated light wherein
        said light-sensitive material and said two-dimensional spatial modulator are relatively scanned in a direction of one pixel column in said two-dimensional spatial modulator, as well as, in synchronism with this scanning, an image created by said two-dimensional spatial modulator is also scanned in said direction so as to perform multiple exposures of said light-sensitive material and wherein
        exposure with part of pixels in at least one of pixel columns is rested always irrespective of the image to be recorded such that a maximum quantity of exposure with each of the pixel columns in said direction is equal in each pixel column.

2. The image exposing method according to claim 1, wherein successive measurements of quantity of light from a predetermined number of pixels are performed for all pixels and the pixels for which exposure is rested always are determined from results of the measurements.

3. The image exposing method according to claim 2, wherein said two-dimensional spatial modulator is a digital micro-mirror device and quantities of light from said predetermined number of pixels or pixel columns are measured with reflected light in non-exposure mode.

4. The image exposing method according to claim 1, wherein successive measurements of quantity of light from a predetermined number of pixel columns in said direction are performed for all pixel columns and the pixels for which exposure is rested always are determined from results of the measurements.

5. The image exposing method according to claim 4, wherein said two-dimensional spatial modulator is a digital micro-mirror device and quantities of light from said predetermined number of pixels or pixel columns are measured with reflected light in non-exposure mode.

6. An image exposing apparatus, comprising:
   a light source for emitting light matching the spectral sensitivity of a light-sensitive material;
   a two-dimensional spatial modulation for modulating the light emitted from the light source in each of two-dimensional pixels;
   an exposing unit for exposing the light-sensitive material with the light modulated by the two-dimensional spatial modulator; wherein said exposing unit comprises:
      a first scanning unit for relatively scanning said light-sensitive material and said two-dimensional spatial modulator in a direction of one pixel column in said two-dimensional spatial modulator;
      a second scanning unit for also scanning an image created on the light-sensitive material by the light modulated in each of the two-dimensional pixels by said two-dimensional spatial modulator in said direction in synchronism with relative scanning so as to perform multiple exposures of said light-sensitive material; and
      control unit for controlling the two-dimensional spatial modulator in such a way that exposure with part of pixels in at least one of pixel columns is rested always irrespective of the image to be recorded such that a maximum quantity of exposure with each of the pixel columns of the two-dimensional pixels of the two-dimensional spatial modulator in said direction is equal in each pixel column.

7. The image exposing apparatus according to claim 6, wherein said first scanning unit is a scanning unit for moving said light-sensitive material with respect to the two-dimensional spatial modulator.

8. The image exposing apparatus according to claim 6, wherein said first scanning unit is a drum scanner.

9. The image exposing apparatus according to claim 6, wherein said-second scanning unit is a switching unit for switching on or off exposure of the image created by said two-dimensional spatial modulator.

10. The image exposing apparatus according to claim 6, wherein said two-dimensional spatial modulator is a digital micro-mirror device.

11. An image exposing method, comprising:
    emitting light from a light source matching the spectral sensitivity of a light-sensitive material;
    modulating the thus emitted light with a two-dimensional spatial modulator having a plurality of rows of pixels and a plurality of columns of pixels; and
    exposing the light-sensitive material with the thus modulated light wherein
       said light-sensitive material and said two-dimensional spatial modulator are relatively scanned in a direction of one pixel column in said two-dimensional spatial modulator, as well as, in synchronism with this scanning, an image created by said two-dimensional spatial modulator is also scanned in said direction so as to perform multiple exposures of said light-sensitive material and wherein
       exposure of pixels in at least one of the plurality of pixel columns is set to have a predetermined number of pixels normally turned off in said pixel column, irrespective of the image to be recorded, such that a maximum quantity of exposure with each of the pixel columns in said direction is equal in each pixel column.

12. The image exposing method according to claim 11, wherein successive measurements of quantity of light from a predetermined number of pixels are performed for all pixels and the pixels which are normally turned off are determined from results of the measurements.

13. The image exposing method according to claim 12, wherein said two-dimensional spatial modulator is a digital micro-mirror device and quantities of light from said predetermined number of pixels or pixel columns are measured with reflected light in non-exposure mode.

14. The image exposing method according to claim 11, wherein successive measurements of quantity of light from a predetermined number of pixel columns in said direction are performed for all pixel columns and the pixels which are normally turned off are determined from results of the measurements.

15. The image exposing method according to claim 14, wherein said two-dimensional spatial modulator is a digital micro-mirror device and quantities of light from said predetermined number of pixels or pixel columns are measured with reflected light in non-exposure mode.

16. An image exposing apparatus, comprising:
    a light source for emitting light matching the spectral sensitivity of a light-sensitive material;
    a two-dimensional spatial modulator for modulating the light emitted from the light source in each of two-dimension al pixels, said two-dimensional spatial modulator having a plurality of rows of pixels and a plurality of columns of pixels;
    an exposing unit for exposing the light-sensitive material with the light modulated by the two-dimensional spatial modulator; wherein said exposing unit comprises:
       a first scanning unit for relatively scanning said light-sensitive material and said two-dimensional spatial modulator in a direction of one pixel column in said two-dimensional spatial modulator;
       a second scanning unit for also scanning an image created on the light-sensitive material by the light modulated in each of the two-dimensional pixels by said two-dimensional spatial modulator in said direction in synchronism with relative scanning so as to perform multiple exposures of said light-sensitive material; and
       control unit for controlling the two-dimensional spatial modulator in sach a way that exposure of pixels in at least one of the plurality of pixel columns is set to have a predetermined number of pixels normally turned off in said pixel column, irrespective of the image to be recorded, such that a maximum quantity of exposure with each of the pixel columns of the two-dimensional pixels of the two-dimensional spatial pixel column.

17. The image exposing apparatus according claim 16, wherein said first scanning unit is a scanning unit for moving said light-sensitive material with respect to the two-dimensional spatial modulator.

18. The image exposing apparatus according to claim 16, wherein said first scanning unit is a drum scanner.

19. The image exposing apparatus according to claim 16, wherein said second scanning unit is a switching unit for switching on or off exposure of the image created by said two-dimensional spatial modulator.

20. The image exposing apparatus according to claim 16, wherein said two-dimensional spatial modulator is a digital micro-mirror device.

21. An image exposing method, comprising:

emitting light from a light source matching the spectral sensitivity of a light-sensitive material;

modulating the thus emitted light with a two-dimensional spatial modulator having a plurality of rows of pixels and a plurality of columns of pixels; and exposing the light-sensitive material with the thus modulated light wherein said light-sensitive material and said two-dimensional spatial modulator are relatively scanned in a direction of one pixel column in said two-dimensional spatial modulator, as well as, in synchronism with this scanning, an image created by said two-dimensional spatial modulator is also scanned in said direction, and exposure of pixels in at least one of the plurality of pixel columns is set to have a predetermined number of pixels normally turned off in said pixel column, irrespective of the image to be recorded, such that a maximum quantity of exposure with each of the pixel columns in said direction is equal in each pixel column.

22. The method of claim 21, further comprising making successive measurements of light from a predetermined number of pixels to determine a light distribution of said pixels, and determining which pixels in the plurality of pixel columns should be set to a normally off state based on results of the successive in measurements.

23. The method of claim 22, wherein the successive measurements are performed at a non-exposure condition when the light-sensitive material is not being exposed with modulated light.

24. The method of claim 22 wherein successive measurements comprise taking measurements of light output quantity for groups of pixels in a column direction to determine a light quantity output of each pixel column, said groups of pixels corresponding to fewer than all pixels in the column.

25. The method of claim 24 wherein once the light output quantity for the groups of pixels in a the column direction for each column reaches a predetermined quantity, the remainder of the pixels in the column are set to the normally off state.

26. An image exposing apparatus, comprising:

a light source for emitting light matching the spectral sensitivity of a light-sensitive material;

a two-dimensional spatial modulator for modulating the light emitted from the light source in each of two-dimensional pixels, said two-dimensional spatial modulator having a plurality of rows of pixels and a plurality of columns of pixels;

an exposing unit for exposing the light-sensitive material with the light modulated by the two-dimensional spatial modulator; wherein said exposing unit comprises:

a first scanning unit for relatively scanning said light-sensitive material and said two-dimensional spatial modulator in a direction of one pixel column in said two-dimensional spatial modulator;

a second scanning unit for also scanning an image created on the light-sensitive material by the light modulated in each of the two-dimensional pixels by said two-dimensional spatial modulator in said direction in synchronism with relative scanning; and control unit for controlling the two-dimensional spatial modulator in such a way that exposure of pixels in at least one of the plurality of pixel columns is set to have a predetermined number of pixels normally turned off in said pixel column, irrespective of the image to be recorded, such that a maximum quantity of exposure with each of the pixel columns of the two-dimensional pixels of the two-dimensional spatial modulator in said direction is equal to each pixel column.

27. The apparatus of claim 26, further comprising a light detector for measuring successive measurements of light from a predetermined number of pixels to determine a light distribution of said pixels, and determining which pixels in the plurality of pixel columns should be set to a normally off state based on results of the successive measurements.

28. The apparatus of claim 27, wherein the light detector makes successive measurements when the exposing unit is not exposing said light sensitive material.

29. The apparatus of claim 27 wherein the light detector takes successive measurements of light output quantity for groups of pixels in a column direction to determine a light quantity output of each pixel column, said groups of pixels corresponding to fewer than all pixels in the column.

30. The apparatus of claim 27, wherein once the light output quantity for the groups of pixels in a the column direction for each column reaches a predetermined quantity, the control units sets the remainder of the pixels in the column to the normally off state.

* * * * *